(12) United States Patent
Vervaart

(10) Patent No.: US 12,484,337 B2
(45) Date of Patent: Nov. 25, 2025

(54) CONTROL CIRCUITRY OF A MICROCONTROLLER OF A PHOTOVOLTAIC SYSTEM WITHOUT BATTERY AND ASSOCIATED METHOD AND DEVICES

(71) Applicant: Commissariat à l'énergie atomique et aux énergies alternatives, Paris (FR)

(72) Inventor: Mark Vervaart, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 50 days.

(21) Appl. No.: 18/545,714

(22) Filed: Dec. 19, 2023

(65) Prior Publication Data

US 2024/0213378 A1    Jun. 27, 2024

(30) Foreign Application Priority Data

Dec. 20, 2022    (FR) .................................. 22 13992

(51) Int. Cl.
| | | |
|---|---|---|
| H10F 77/00 | (2025.01) | |
| G01R 31/317 | (2006.01) | |
| G05F 1/56 | (2006.01) | |
| H10F 19/90 | (2025.01) | |

(52) U.S. Cl.
CPC ..... *H10F 77/955* (2025.01); *G01R 31/31703* (2013.01); *G05F 1/562* (2013.01); *H10F 19/90* (2025.01)

(58) Field of Classification Search
CPC . H10F 77/955; H10F 19/90; G01R 31/31703; G05F 1/562
See application file for complete search history.

(56) References Cited

U.S. PATENT DOCUMENTS

2010/0322784 A1    12/2010    Rubio et al.
2018/0281994 A1    10/2018    De Payrebrune

FOREIGN PATENT DOCUMENTS

| CN | 110663632 A | * | 1/2020 | ............. H02S 40/30 |
| FR | 3 113 556 A1 | | 3/2022 | |

OTHER PUBLICATIONS

Feng et al., CN 110663632 A, English Machine Translation. (Year: 2020).*
French Preliminary Search Report Issued Jul. 28, 2023 in French Application 22 13992 filed on Dec. 20, 2022 (with English Translation of Categories of Cited Documents), 3 pages.

* cited by examiner

*Primary Examiner* — Tae-Sik Kang
(74) *Attorney, Agent, or Firm* — Oblon, McClelland, Maier & Neustadt, L.L.P.

(57) ABSTRACT

A control circuit of a controller of a photovoltaic system is provided, the control circuit including an input, an output, a start unit consisting of a power dissipation circuit, a voltage regulation circuit and a comparator, a first switch having a position wherein the start unit is connected to the input and an inverse position, and a second switch having a position wherein the input and the output are not connected and an inverse position. The comparator compares the voltages of the dissipation circuit and of the regulation circuit, the comparator outputting a command voltage of the two switches on the basis of the comparison.

12 Claims, 2 Drawing Sheets

Figure 1:
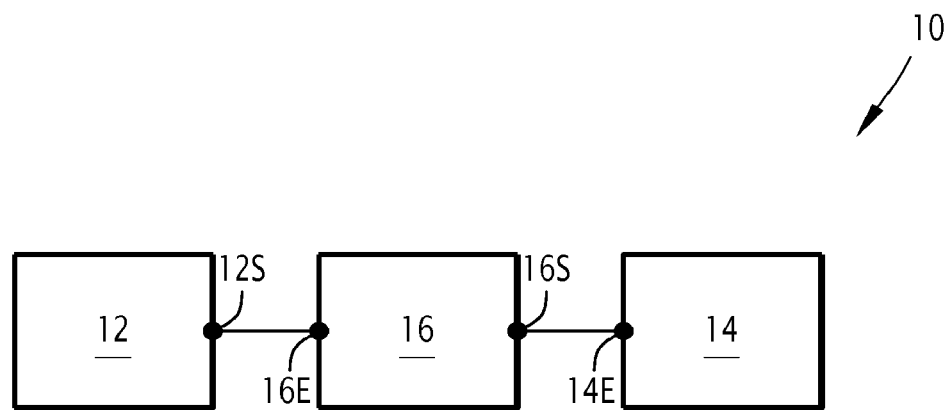

CONTROL CIRCUITRY OF A MICROCONTROLLER OF A PHOTOVOLTAIC SYSTEM WITHOUT BATTERY AND ASSOCIATED METHOD AND DEVICES

The present invention relates to a control circuit for a microcontroller of a photovoltaic system comprising a photovoltaic module. The present invention further relates to an assembly comprising such a control circuit and a microcontroller and to a photovoltaic system comprising such elements. The present invention further relates to a method for controlling such a control circuit.

Because of global warming, it is desirable to develop so-called "renewable" energies. Among such energies, solar energy is particularly interesting.

One way to benefit from solar energy is to use a photovoltaic module that is suitable for converting energy from photons generated by the sun into electrical energy. To this end, the photovoltaic module includes a set of photovoltaic cells which are electrically interconnected. Such cells perform a photoelectric conversion. As a result, it is thereby possible for the photovoltaic module to function as a direct current electric generator in the presence of solar radiation.

Now, in order to make use of the generated current in a specific use, it is also necessary to take into account the fact that the use requires a voltage comprised between a minimum voltage and a maximum voltage.

It is also known how to use a battery the role of which is twofold: on the one hand to serve as a reservoir for the energy produced by the photovoltaic module and on the other hand to serve as a voltage source for the desired use.

The entire photovoltaic module and battery thereby form an autonomous photovoltaic system in the sense that the system is not coupled to the power grid.

However, the lifetime of such a photovoltaic system is, in practice, limited by the service life of the battery.

It would then be enough to do without a battery but at the beginning of the day, when the irradiance is very low, a start-and-stop phenomenon takes place.

Indeed, during the night, the power provided by the photovoltaic module is zero, and at the very beginning of the day, there is a period during which there is not yet enough energy to properly start the system including the photovoltaic module.

In fact, as soon as a ray of light reaches the photovoltaic module, the latter quickly generates a voltage higher than the start voltage.

However, such attempt to start fails because the current produced is still insufficient. The phenomenon is repeated until the current produced is sufficient.

There is thus a need for a photovoltaic system that can operate without the use of a battery.

To this end, the description describes a control circuit of a controller of a photovoltaic system comprising a photovoltaic module, the control circuit including:
an input suitable for connection to the photovoltaic module,
an output suitable for being connected to the controller,
a circuit for dissipating the power received at the input of the control circuit,
a voltage regulation circuit received on the input of the control circuit,
a comparator, the whole of the dissipation circuit, the regulation circuit and the comparator forming a start unit,
a first switch having a first position wherein the start unit is connected to the input of the control circuit and a second position wherein the starting unit is not connected to the input of the control circuit, the position of the first switch being controllable by a command voltage, and
a second switch having a first position wherein the input and output of the control circuit are not connected and a second position wherein the input and output of the control circuit are connected, the position of the second switch being controllable by a command voltage,
the comparator being adapted to compare the voltage at a point of the dissipation circuit with the voltage at a point of the voltage regulation circuit, each of the points used by the comparator being called the comparison point, the comparator being adapted to output a command voltage of the two switches on the basis of the comparison between the value of the voltages of the two comparison points.

According to particular embodiments, the control circuit has one or a plurality of the following features, taken individually or according to all technically possible combinations:
when the voltage at a point of the voltage regulation circuit is lower than the voltage at a point of the dissipation circuit, the comparator is adapted to emit a command voltage imposing that the position of the second switch is the second position.
when the voltage at a point of the voltage regulation circuit is lower than the voltage at a point of the dissipation circuit, the comparator is adapted to emit a command voltage imposing that the position of the first switch is the second position.
the dissipation circuit is a bridge having at least two components and a midpoint, the point of comparison of the dissipation circuit being the midpoint.
the components of the dissipation circuit are in series.
the components of the dissipation circuit are two resistors of the same value.
the regulation circuit is adapted to ensure that the voltage at the comparison point of the regulation circuit is equal to the voltage received at the input up to a threshold voltage, the voltage at the comparison point of the regulation circuit being equal to the threshold voltage for a voltage received at the input greater than the threshold.
the regulation circuit is a bridge with at least two components and a midpoint, the comparison point of the control circuit being the midpoint of the regulation circuit.
the regulation circuit contains a voltage regulator component.
the voltage regulator component is a Zener diode.
the regulation circuit consists of a resistor and a Zener diode in series, the Zener diode having a cathode connected to the midpoint of the regulation circuit.
The Zener diode has a Zener voltage, the comparator being supplied with a supply voltage equal to twice the Zener voltage.

The description further refers to an assembly including:
a controller of a photovoltaic system comprising a photovoltaic module, and
a control circuit as described hereinabove, the controller being connected to the output of the control circuit.

The description further relates to a photovoltaic system comprising:
a photovoltaic module, a controller, and
a control circuit as described hereinabove, the input of the control circuit being connected to the photovoltaic module and the output of the control circuit being connected to the controller.

In the present description, the expression "adapted to" means equally well "suitable for" or "configured for".

Figure 2:
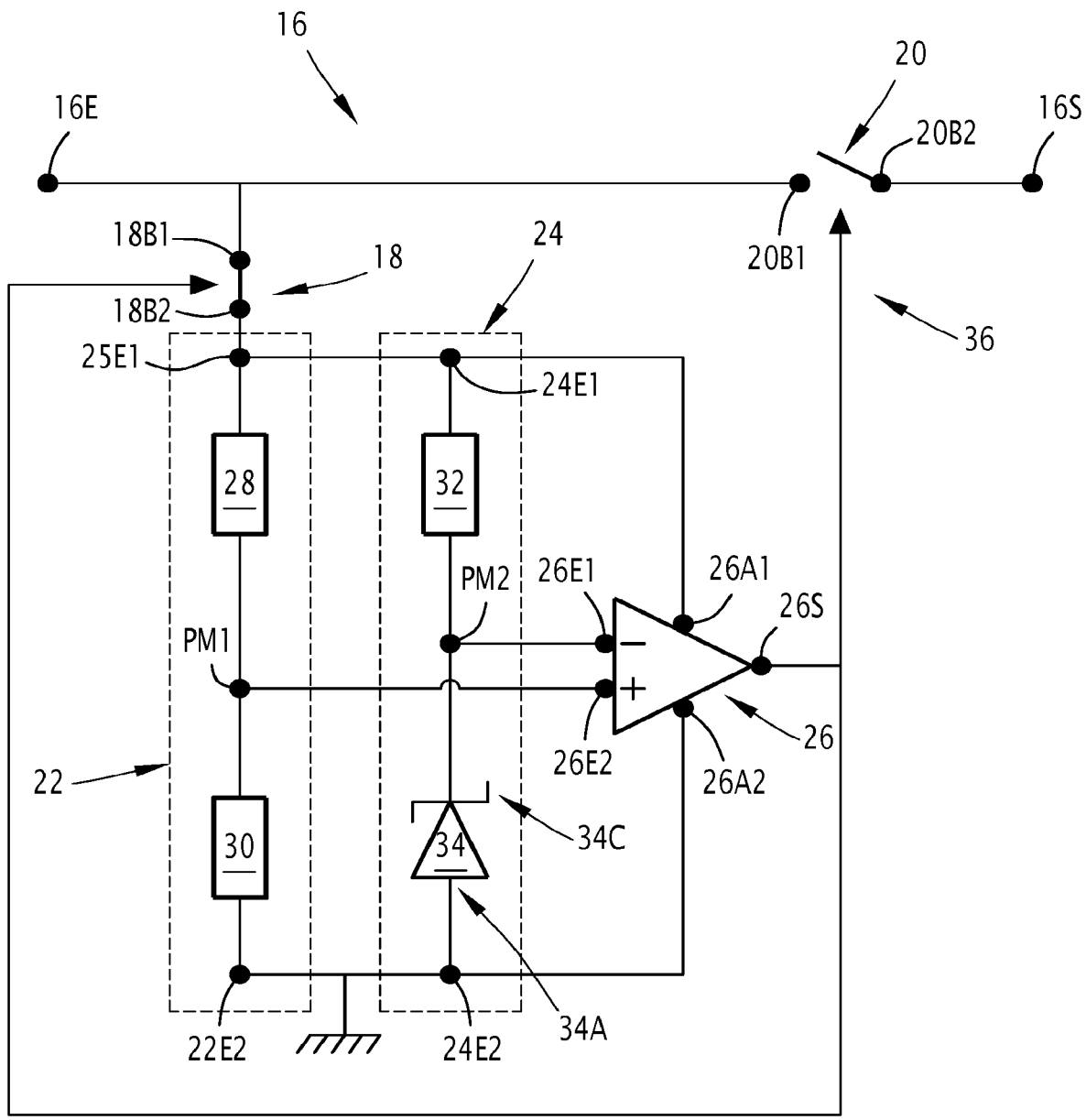

The features and advantages of the invention will appear upon reading the following description, given only as an example, but not limited to, and making reference to the enclosed drawings, wherein:

FIG. 1 is a block diagram of an example of a photovoltaic system comprising in particular a controller and a control circuit of the controller, and FIG. 2 is a schematic view of the control circuit shown in FIG. 1.

The photovoltaic system 10 is shown schematically in FIG. 1.

The photovoltaic system 10 is herein a system adapted to convert incident solar energy into electrical energy usable in a predefined use.

To this end, as can be seen in FIG. 1, the photovoltaic system 10 includes a set of elements amongst which a photovoltaic module 12 and a controller 14.

The photovoltaic module 12 converts light energy into electrical energy. To this end, the photovoltaic module 12 groups together a set of photovoltaic cells.

The photovoltaic module 12 is adapted to deliver an output current which is proportional to the irradiance of the light received by the photovoltaic module 12.

A voltage is also generated at the output of the photovoltaic module 12, the voltage varying according to the irradiance. Hereinafter in the description, the output voltage of the photovoltaic module 12 is denoted by $V_{mod}$.

The controller 14 serves to control the different electronic elements of the photovoltaic system 10.

The electronic elements include e.g. the supervision system, the system deciding from which moment to switch to the mode of production of electricity by the photovoltaic module 12 or components used for the injection into the network of the electricity produced by the photovoltaic module.

The controller 14 is herein a microcontroller 14.

As such, in order to function properly, the controller 14 needs a relatively low operating power.

According to a typical example, but not limited to, the controller 14 consumes a voltage of 5 V for a current of 20 mA.

The photovoltaic system 10 further includes a control circuit 16 of the controller 14.

The control circuit 16 is interposed between the photovoltaic module 12 and the controller 14.

The above means that the control circuit 16 has an input 16E and an output 16S, the input 16E of the control circuit 16 being connected to the photovoltaic module 12 (more precisely to the output 12S thereof) and the output 16S of the control circuit 16 being connected to the controller 14.

As the name indicates, the control circuit 16 is used for controlling the controller 14 and more precisely for controlling the moments when same should work.

The control circuit 16 serves, more particularly, as a starting circuit of the controller 14.

In the context described, the control circuit 16 is thereby adapted to detect a very low irradiance, to determine whether the irradiance satisfies a predefined condition and to trigger the start of the controller 14 when the predefined condition is fulfilled.

The control circuit 16 is shown in more detail in FIG. 2.

The control circuit 16 includes a first switch 18, a second switch 20, a first bridge 22, a second bridge 24 and a comparator 26.

Each switch 18 (20, respectively) has two terminals 18B1 and 18B2 (20B1 and 20B2, respectively), one terminal 18B1 (20B1, respectively) being connected to the input 16E of the control circuit 16 and hence having a potential equal to the output voltage $V_{mod}$ of the photovoltaic module 12.

The other terminal 18B2 of the first switch 18 is connected to the two bridges 22 and 24 while the terminal of the second switch 20 is connected to the output 16S of the control circuit 16 and thereby to the input 14E of the controller 14.

According to the example described, each switch 18 and 20 is a controllable switch.

Each switch 18 and 20 has two positions, an open position wherein the two terminals 18B1 and 18B2 (20B1 and 20B2, respectively) thereof are not connected and a closed position wherein the two terminals 18B1 and 18B2 (20B1 and 20B2, respectively) are connected.

The position of each switch 18 or 20 depends on the voltage applied to the switch 18 or 20.

In the present case, it will appear subsequently that the voltage applied to the switches 18 and 20 is the same, since the voltage comes from the comparator 26. The comparator 26 is thereby adapted to simultaneously control the position of the two switches 18 and 20.

The first switch 18 is, furthermore, inverted in the sense that the default position is the position wherein the input 16E of the control circuit 16 is connected to the dissipation circuit 22.

The first bridge 22 includes two components 28 and 30 in series, two ends 22E1 and 22E2 and a midpoint PM1.

The second bridge 24 includes two components 32 and 34 in series, two ends 24E1 and 24E2 and a midpoint PM2.

The first end 22E1 or 24E1 of each bridge 22 or 24 is connected to the first switch 18 and thereby connected to the input 16E of the control circuit 16. The first end 22E1 or 24E1 of each bridge 22 or 24 is thereby at a potential equal to the output voltage $V_{mod}$ of the photovoltaic module 12.

The second end 22E2 or 24E2 of each bridge 22 or 24 is connected to ground.

The voltage between the ends 22E1 and 22E2 (24E1 and 24E2, respectively) of each bridge 22 or 24 is the output voltage $V_{mod}$ of the photovoltaic module 12.

Because of the aforementioned connections, the two bridges 22 and 24 are in a parallel configuration.

In the case of the first bridge 22, the two components 28 and 30 are each a resistor.

The resistor 28 of the first bridge 22, the terminals of which are connected to the first end 22E1 of the first bridge 22 and to the midpoint PM1, is referred to hereinafter as the "first resistor 28". The value of the first resistor 28 is denoted by R1.

The other resistor 30, the terminals of which are connected to the second end and to the midpoint, is referred to hereinafter as the "second resistor 30". The value of the second resistor 30 is denoted by R2.

Due to said configuration, the first bridge 22 forms a voltage divider.

As a result therefrom, the voltage of the midpoint PM1 of the first bridge 22 is equal to the product of the voltage between the ends 22E1 and 22E2 of the first bridge 22 with the ratio between the value R2 of the second resistor 30 and the sum of the value R1 of the first resistor 28 and the value R2 of the second resistor 30.

Since the voltage at the terminals of the first bridge 22 is the output voltage $V_{mod}$ of the photovoltaic module 12, one has:

$$V_{PM1} = \frac{R2}{R1+R2} V_{mod}$$

where $V_{PM1}$ is the voltage of the midpoint PM1 of the first bridge 22.

In the case of the second bridge 24, the two components 32 and 34 are a resistor and a Zener diode.

The resistor 32 of the second bridge 24, the terminals of which are connected to the first end 24E1 and to the midpoint PM2, is referred to hereinafter as the "third resistor 32". The value of the third resistor 32 is denoted by R3.

The Zener diode 34 has an anode 34A and a cathode 34C.

A Zener diode is a semiconductor component which has the particularity, unlike conventional diodes, to be adapted to let current flow in both directions under certain conditions.

In the anode-cathode flow direction, a Zener diode 34 behaves like a conventional diode. The associated threshold voltage is usually on the order of 0.6 V.

In the reverse direction (cathode to anode), the current flows only from the moment when the voltage value across the terminals of the Zener diode 34 (in such case, the reverse voltage) has reached a threshold limit. Such effect is often called the avalanche effect.

The reverse voltage corresponding to the limit threshold is called the breakdown voltage or the Zener voltage $V_{Zener}$. Current technology gives access to Zener voltages $V_{Zener}$ varying greatly depending on the Zener diode considered, values comprised between 1.2 V and several hundred volts being obtained.

The anode 34A is connected to the second end 24E2 of the second bridge 14 while the cathode 34C is connected to the midpoint PM2 of the second bridge 24.

Herein, the Zener diode 34 is thus connected in the reverse direction, which gives the Zener diode a voltage regulator role.

As result therefrom, the Zener diode 34 becomes conductive when the voltage at the terminals 34C and 34A thereof reaches the Zener voltage $V_{Zener}$. When the voltage applied to the terminals 34C and 34A thereof exceeds the Zener voltage $V_{Zener}$, the Zener diode 34 maintains the voltage at the terminals 34C and 34A thereof at the value of the Zener voltage $V_{Zener}$.

The comparator 26 includes power supply terminals 26A1 and 26A2, two inputs and one output 28S.

The comparator 26 is an active component supplied by the voltage applied to the supply terminals 26A1 and 26A2 thereof.

The first power supply terminal 26A1 is connected to the output of the photovoltaic module 12 via the first switch 18 and the second power supply terminal 26A2 is connected to ground.

The supply voltage at the terminals of the comparator 26 is thus the output voltage $V_{mod}$ of the photovoltaic module 12.

The role of the comparator 26 is to compare the difference of potential between the two inputs 26E1 and 26E2 thereof.

The first input 26E1 of the comparator 26 is denoted by a sign "−" in FIG. 2 whereas the second input 26E2 of the comparator 26 is denoted by a sign "+" in FIG. 2. As a result, the value of the voltage at the first input 26E1 of the comparator 26, at the second input 26E2 of the comparator 26, respectively, is denoted by V−, V+, respectively.

The comparator 26 is adapted to perform a comparison between the value V− of the voltage at the first input 26E1 and the value V+ of the voltage at the second input 26E2 and to output a signal which is dependent on the sign of the difference between the value V− of the voltage on the first input 26E1 and the value V+ of the voltage on the second input 26E2.

The output of the comparator 26 thereby takes two voltage values, a first value corresponding to a negative difference and a second value corresponding to a positive difference.

More precisely, when the value V− of the voltage at the first input 26E1 is greater than the value V+ of the voltage at the second input 26E2, the output of the comparator 26 is at the first value, the first value being a zero voltage, which corresponds to the 'sunrise'.

Conversely, when the value V− of the voltage on the first input 26E1 is less than or equal to the voltage on the value V+ of the voltage on the second input 26E2, the output is at the second value, the second value being the supply voltage, i.e. the output voltage $V_{mod}$ of the photovoltaic module 12.

As indicated schematically by the arrow 36 in FIG. 2, the output voltage of the comparator 26 is used for controlling the position of the second switch 20.

Thereby, when the output of the comparator 26 is at the first value (zero voltage), the second switch 20 switches to or is in the open position whereas, when the output of the comparator 26 is at the second value ($V_{mod}$), the second switch (20) switches to or is in the closed position.

The position of the second switch 20 thereby depends on the comparison between the value V− of the voltage at the first input 26E1 and the value V+ of the voltage at the second input 26E2.

In the circuit shown in FIG. 2, the second input 26E2 is connected to the midpoint of the first bridge 22 and the first input 26E1 is connected to the midpoint of the second bridge 24.

The comparator 26 thereby performs a comparison between the value $$\frac{R2}{R1+R2} V_{mod}$$

and the voltage at the terminals of the Zener diode.

The operation of the control circuit 16 is now described with reference to a start of the controller 14 during sunrise in the morning.

The goal is to make sure that the controller 14 starts when enough sunlight illuminates the photovoltaic module 12, in order to prevent a start-and-stop phenomenon.

Indeed, since at night, the power supplied by the photovoltaic module 12 is zero, at the very beginning of the day, there is a period during which there is not yet enough energy to properly start the controller 14.

The above is due in particular to the fact that at the first light of the day, a photovoltaic cell quickly generates a voltage higher than the start voltage of the controller 14, so that same tries to start. However, the current produced is then negligible, so that the controller 14 cannot start and so on until the current produced is sufficient.

Such a start can damage the controller 14.

Also, it can be chosen that the controller 14 will be started only when a certain power is available.

In the example described, the power threshold varies according to a limit value of current to be delivered and a limit value of voltage.

Otherwise formulated, a start threshold for voltage and a start threshold for current, are used.

In order to obtain such values, taking into account the typical values mentioned hereinabove (voltage of 5 V for a current of 20 mA), it is useful to take a margin, the margin depending on the scenario.

For example, herein, a voltage value of 10 V and a current of 50 mA are chosen. The above means that the control circuit 16 herein tries to start the controller 14 only when the voltage and the current supplied by the photovoltaic module 12 are respectively at the voltage starting threshold (10 V) and at the current starting threshold (50 mA).

To explain how the control circuit 16 performs such function, it should be recalled that the comparison voltage with the voltage V− at the first input 26E1 of the comparator 26 is permanently $$\frac{R2}{R1+R2}V_{mod}.$$

The voltage applied to the terminals of the Zener diode is herein the output voltage of the photovoltaic module 12 $V_{mod}$ but the value V− of the voltage at the first input 26E1 of the comparator 26 will depend on the operating states of the Zener diode.

When the voltage at the terminals of the Zener diode is lower than the Zener voltage $V_{Zener}$, the Zener diode blocks the current and the voltage at the terminals of the Zener diode follows the output voltage of the photovoltaic module 12 $V_{mod}$.

The above means that V−=$V_{mod}$ in such operating state.

As a result, in such operating state, the voltage across the terminals of the Zener diode is permanently higher than the comparison voltage $$\frac{R2}{R1+R2}V_{mod}.$$

Thereby, the comparator 26 outputs the first value (zero voltage) and the second switch 20 is in the open position.

When the voltage at the terminals of the Zener diode is greater than the Zener voltage $V_{Zener}$, the Zener diode lets the current flow and the voltage at the terminals of the Zener diode then no longer follows the voltage of the module but remains at the Zener voltage $V_{Zener}$.

It results therefrom that the value V− of the voltage at the first input 26E1 remains set to the Zener voltage $V_{Zener}$.

In parallel, the comparison voltage is still $$\frac{R2}{R1+R2}V_{mod}.$$

Thereby, when the voltage of the module exceeds the Zener voltage $V_{Zener}$, the comparator 26 compares the value of the Zener voltage $V_{Zener}$ with the value $$\frac{R2}{R1+R2}V_{mod}.$$

When the value $$\frac{R2}{R1+R2}V_{mod}$$

is less than $V_{Zener}$, the comparator 26 outputs the first value (zero voltage) and the second switch 20 is in (or switches to) the open position whereas, when the value $$\frac{R2}{R1+R2}V_{mod}$$

is greater than $V_{Zener}$, the comparator 26 outputs the second value ($V_{mod}$) and the second switch 20 is in (or switches to) the closed position.

There are thus three operating states which are briefly described herein.

When the voltage of the module $V_{mod}$ is comprised between 0 and the Zener voltage $V_{Zener}$, the Zener diode is in a blocked state and the comparator 26 outputs the first value (zero voltage).

When the voltage of the module $V_{mod}$ is between the Zener voltage $V_{Zener}$ and $$\frac{R1+R2}{R2}$$

$V_{Zener}$, an avalanche effect takes place in the Zener diode but the comparator 26 always outputs the first value.

When the voltage of the module $V_{mod}$ is greater than or equal $$\frac{R1+R2}{R2}V_{Zener},$$

an avalanche effect always takes place in the Zener diode but the comparator 26 outputs the second value ($V_{mod}$).

As a numerical example, it is assumed that the Zener voltage $V_{Zener}$ is equal to 5V and that the resistance values of the first resistor 28 and of the second resistor 30 are equal (R1=R2).

For optimum operation of the comparator 26, the supply voltage of the comparator 26 will be taken equal to twice the Zener voltage $V_{Zener}$, i.e. herein 10 V.

The three preceding operating states then become the following.

When the voltage of the module is comprised between 0 and 5 V, the Zener diode is in a blocked state and the comparator 26 outputs the first value (zero voltage).

When the voltage of the module is comprised between 5 V and 10 V, an avalanche effect takes place in the Zener diode but the comparator 26 always outputs the first value.

When the voltage of the module is greater than or equal to 10 V, in the presence of an avalanche effect, the comparator 26 outputs the second value ($V_{mod}$).

From the point of view of the second switch 20 or of the output of the comparator 26, there are only two operating states: a first operating state wherein the module voltage is less than 10 V with the second switch 20 in the open position and a second operating state wherein the module voltage is greater than or equal to 10 V with the second switch 20 in the closed position.

More generally, if we forget about the aforementioned particular numerical values, the control circuit 16 works in a first operating state wherein the module voltage is less than $$\frac{R1+R2}{R2}V_{Zener}$$

with the second switch 20 in the open position and a second operation condition wherein the module voltage is greater than or equal to $$\frac{R1+R2}{R2}V_{Zener}$$

with the second switch 20 in the closed position.

It is thus only the values of the Zener voltage $V_{Zener}$, of the value R1 of the first resistor 28 and of the value R2 of the second resistor 30 that set the threshold above which the second switch 20 switches from the open position to the closed position.

Consequently, to obtain a start threshold $V_{seuil}$ of set voltage, it means that the values R1 and R2 of the first resistor 28 R1 and of the second resistor 30 R2 and of the Zener voltage $V_{Zener}$ are chosen so that there is an equality relation $$\frac{R1+R2}{R2}V_{Zener}=V_{thresh}.$$

With the value of R1=R2 and $V_{Zener}$=5V, a start threshold for voltage of 10 V is indeed obtained.

As for the current supplied when the voltage exceeds the start threshold for voltage $V_{thresh}$, it is given by the value of the current flowing through the first bridge 22.

More precisely, such current is, according to Ohm's law, the ratio between the voltage applied at the terminals of the first bridge 22 and the total resistance of the first bridge 22. It is written mathematically as follows:

$$I_{mod}=\frac{V_{thresh}}{R1+R2}$$

Which means that it is desired, at the threshold, that the following relation is verified by the start threshold for current $I_{seuil}$:

$$I_{seuil}=\frac{V_{thresh}}{R1+R2}$$

In the numerical example described, it means that the value of the first resistor 28 and of the second resistor 30 is equal to 100 Ω, in order to guarantee that the current has a value of 50 mA.

It means that the control circuit 16 ensures that the photovoltaic module 12 delivers both a voltage corresponding to the start threshold for voltage $V_{thresh}$ and a current corresponding to the start threshold for current $I_{thresh}$.

Formulated from the point of view of light radiation, the above means that the control circuit 16 is adapted to determine the minimum irradiance that the photovoltaic module 12 should receive in order to meet the criteria with regard to voltage and current, i.e. the minimum power for supplying the controller 14.

The control circuit 16 thereby serves as a power detector for starting the controller 14.

The power below the desired power threshold is dissipated in the first resistor 28 and the second resistor 30.

At the same time as the controller 14 starts, the power dissipation has to cease.

Also, when the controller 14 starts, the comparator 26 also controls the first switch 18 so that same switches to the open position (the position which is not the normal position for the first switch 18) and whereas the second switch 20 is in the closed position.

As a result, it is possible to arrange that the unit of two bridges and of the comparator 26 is disconnected from the input of the control circuit 16.

In other words, the unit of the two bridges and of the comparator 26 is no longer connected to the output of the photovoltaic module 12.

Such unit thus serves as a start unit and the first switch 18 serves to connect/disconnect the start unit.

The starting unit remains disconnected all day long since the sunlight allows the controller 14 to work.

Before nightfall, the controller 14 checks that same closes cleanly and returns the first switch 18 to the closed position, in order to activate the start unit.

A delay of the closing after the turning off of the controller 14 can be implemented so as to prevent the risk of an unexpected restart before total nightfall.

It could be also noted herein that after the turning off of the controller 14, the second switch 20 is in the position corresponding to the open state.

To detect nightfall, the controller 14 monitors the voltage output by the photovoltaic module 12, e.g. by means of a unit for detecting the voltage of the photovoltaic module 12.

The controller 14 is thus adapted to control the position of the first switch 18 as a function of the detected voltage.

The control circuit 16 thus has the advantage of making it possible to control the controller 14 and in particular to ensure a proper start of the latter.

The control circuit 16 is, furthermore, a very simple electronic circuit since same includes only three resistors, a Zener diode and a comparator 26.

The resulting photovoltaic system 10 is thereby suitable for working without a battery.

As a result, a better service life is obtained for the 10 photovoltaic system.

It is of course possible to imagine variants of the control circuit 16 of FIG. 2 performing the same function.

As an example, the two resistors of the first bridge 22 could have different resistance values.

According to a variant, the first bridge 22 could include a plurality of resistors in series, the so-called midpoint then being an intermediate point of the first bridge 22 different from the two ends (herein one of the terminals of the middle resistor).

A first bridge 22 including resistors in parallel could even be envisaged.

In each case, the first bridge 22 serves as a circuit for dissipating the power received at the input of the control circuit 16 during the first part of the morning.

With regard to the second bridge 24, it could also be envisaged to use circuits with more resistances.

Instead of the Zener diode, a more complex circuit with a set-up of a plurality of conventional diodes could be envisaged, in particular to have an adjustable threshold.

More broadly, any component or circuit making it possible to regulate the voltage at a point of the bridge can be considered herein.

In each case, the first bridge 22 serves as a circuit for regulating the voltage received at the input of the control circuit 16, i.e. as a circuit ensuring that the voltage at a point is equal to the voltage received at the input up to a threshold voltage, the voltage at said point being equal to the threshold voltage for a voltage received at input and greater than the threshold.

It should be understood from the aforementioned variants that the comparator 26 does not necessarily perform the comparison at the midpoint but rather at a comparison point forming part of the circuit considered.

Thereby, in all the embodiments described, the control circuit 16 includes a starting unit formed by a dissipation circuit, a voltage regulation circuit and a comparator 26.

The comparator 26 is suitable for comparing the voltage at a comparison point of the dissipation circuit 22 with the voltage at a comparison point of the regulation circuit 24, the comparator 26 being adapted to output a command voltage of the two switches 18 and 20 on the basis of the comparison between the value of the voltages of the two comparison points.

The invention claimed is:

1. A control circuit of a controller of a photovoltaic system comprising a photovoltaic module, the control circuit including:
   an input adapted to be connected to the photovoltaic module,
   an output adapted to be connected to the controller,
   a dissipation circuit for dissipating a power received on the input of the control circuit,
   a voltage regulation circuit received on the input of the control circuit,
   a comparator, wherein a set of the dissipation circuit, the voltage regulation circuit and the comparator form a start unit,
   a first switch having a first position wherein the start unit is connected to the input of the control circuit and a second position wherein the start unit is not connected to the input of the control circuit, the first position and the second position of the first switch being commendable by a first command voltage, and
   a second switch having a first position wherein the input and the output of the control circuit are not connected and a second position wherein the input and the output of the control circuit are connected the first position and the second position of the second switch being commendable by a second command voltage,
   the comparator being adapted to compare a voltage at a first comparison point of the dissipation circuit with a voltage at a second comparison point of the voltage regulation circuit, the comparator being adapted to output the first command voltage of the first switch or the second command voltage of the second switch depending on a comparison between the voltage at the first comparison point and the voltage at the second comparison point,
   the comparator is adapted to output the second command voltage imposing that a position of the second switch is the second position when the voltage at the second comparison point of the voltage regulation circuit is lower than the voltage at the first comparison point of the dissipation circuit, and
   the comparator is adapted to output the first command voltage requiring that a position of the first switch is the second position when the voltage at the second comparison point of the voltage regulation circuit is lower than the voltage at the first comparison point of the dissipation circuit.

2. The control circuit according to claim 1, wherein the dissipation circuit is a bridge having at least two components and a midpoint, the first comparison point of the dissipation circuit being the midpoint.

3. The control circuit according to claim 2, wherein components of the dissipation circuit are in series.

4. The control circuit according to claim 2, wherein components of the dissipation circuit are two resistors of a same value.

5. The control circuit according to claim 1, wherein the voltage regulation circuit is adapted to ensure that the voltage at the second comparison point of the voltage regulation circuit is equal to a voltage received as input up to a threshold voltage, the voltage at the second comparison point of the voltage regulation circuit being equal to the threshold voltage for the voltage received at the input and greater than the threshold voltage.

6. The control circuit according to claim 5, wherein the voltage regulation circuit is a bridge having at least two components and a midpoint, the second comparison point of the voltage regulation circuit being the midpoint of the voltage regulation circuit.

7. The control circuit according to claim 1, wherein the voltage regulation circuit includes a voltage regulation component.

8. The control circuit according to claim 7, wherein the voltage regulator component is a Zener diode.

9. The control circuit according to claim 1, wherein the voltage regulation circuit consists of a resistor and a Zener diode in series, the Zener diode having a cathode connected to a midpoint of the voltage regulation circuit.

10. The control circuit according to claim 9, wherein the Zener diode has a Zener voltage, the comparator being supplied with a supply voltage equal to twice the Zener voltage.

11. A unit of the photovoltaic system that includes the control circuit according to claim 1, comprising:
   the controller of the photovoltaic system comprising the photovoltaic module, and
   the control circuit, the controller being connected to the output of the control circuit.

12. The photovoltaic system that includes the control circuit according to claim 1, comprising:
   the photovoltaic module, and
   the controller,
   wherein the input of the control circuit is connected to the photovoltaic module and the output of the control circuit is connected to the controller.

* * * * *